United States Patent [19]

Craig

[11] 4,179,818
[45] Dec. 25, 1979

[54] TETRAHEDRAL REDUNDANT INERTIAL REFERENCE UNIT

[75] Inventor: Robert J. G. Craig, Malibu, Calif.

[73] Assignee: Litton Systems, Inc., Beverly Hills, Calif.

[21] Appl. No.: 730,419

[22] Filed: Oct. 7, 1976

[51] Int. Cl.$^2$ .............................................. G01C 19/02
[52] U.S. Cl. .................................. 33/321; 73/178 R; 74/5.34
[58] Field of Search ..................... 33/321, 322, 318; 73/1 E, 178 R; 74/5.34, 5.37

[56] References Cited

U.S. PATENT DOCUMENTS

| | | | |
|---|---|---|---|
| 3,401,549 | 9/1968 | Miller | 33/321 X |
| 3,403,874 | 10/1968 | Boskovich et al. | 33/321 X |
| 3,489,004 | 1/1970 | Barnhill et al. | 33/321 X |
| 3,680,355 | 8/1972 | Goldstein et al. | 33/321 X |
| 3,741,500 | 6/1973 | Liden | 33/321 X |

*Primary Examiner*—William D. Martin, Jr.

*Attorney, Agent, or Firm*—Harold E. Gillmann

[57] ABSTRACT

A redundant inertial reference system is provided with four gyroscope units, with the spin axes of the gyroscopes in the units being oriented, respectively, perpendicular to the four faces of an equilateral tetrahedron. Incidentally, a tetrahedron is a four sided body, and an equilateral tetrahedron is a four sided body having equilateral triangles for the four sides. With the four gyroscopes mounted perpendicular to the four sides of an equilateral tetrahedron, each of the gyroscopes is located symmetrically with respect to the others, with an angle of approximately 109.4 degrees between the spin axes of the gyroscopes. The system is particularly applicable to strapdown type inertial guidance systems and can provide three dimensional orientation information even if two of the gyros fail. The system uses four gyro units, a minimum number which can accomplish a foregoing function, with the four gyro units arranged substantially symmetrically with respect to one another.

10 Claims, 8 Drawing Figures

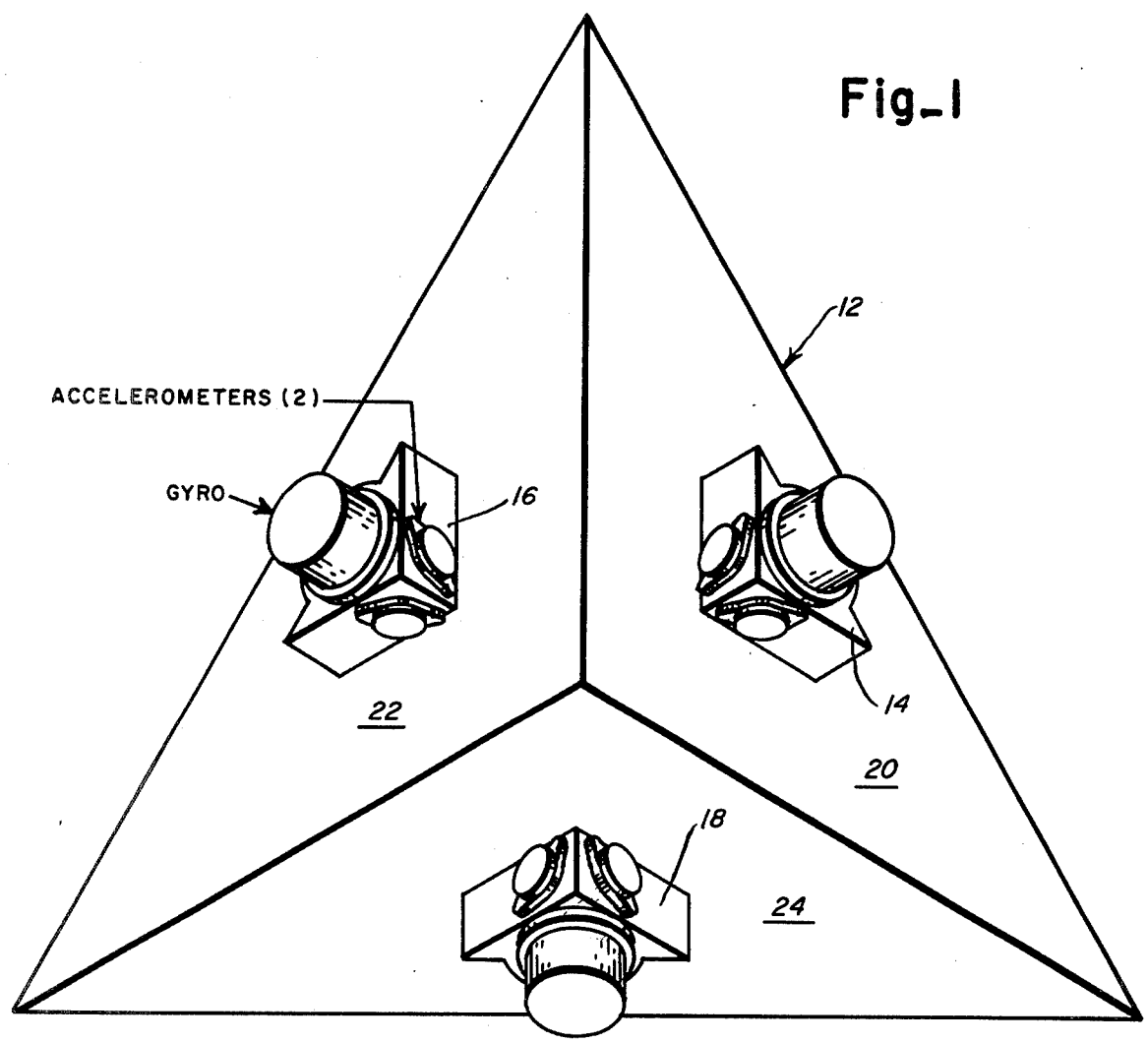

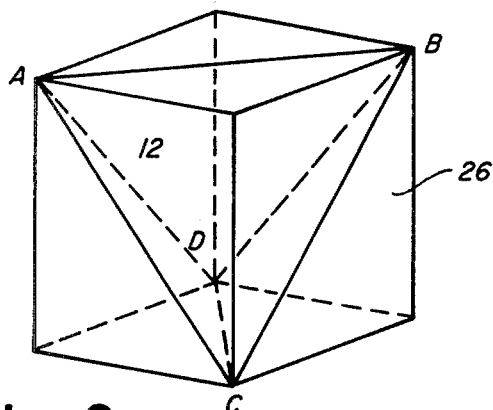
Fig_2
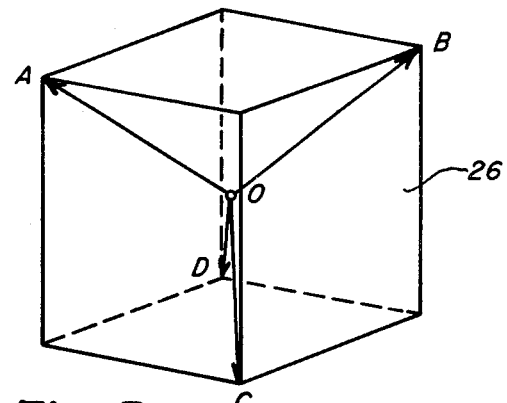
Fig_3
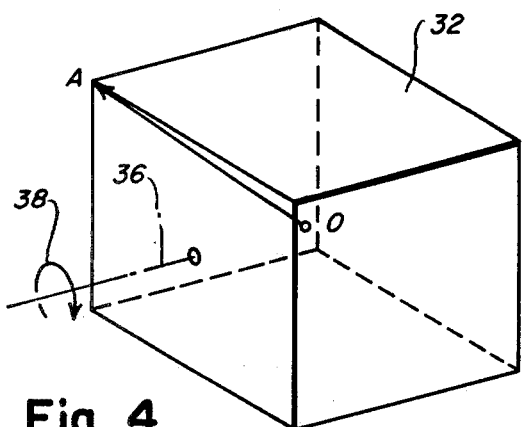
Fig_4
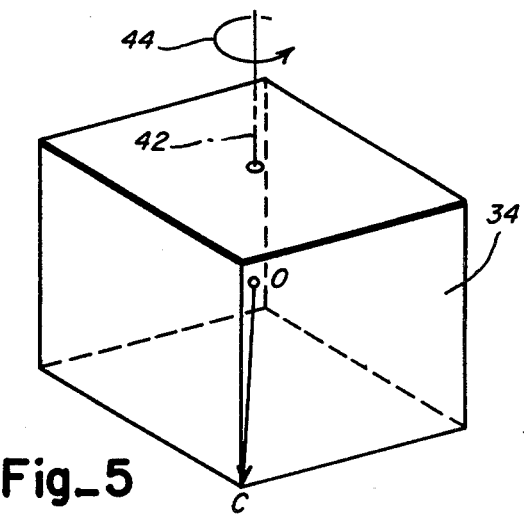
Fig_5
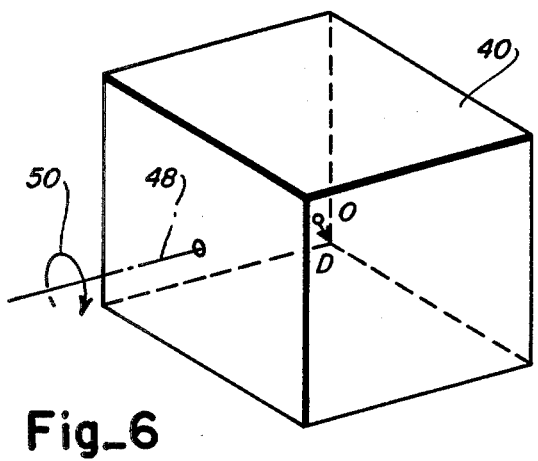
Fig_6
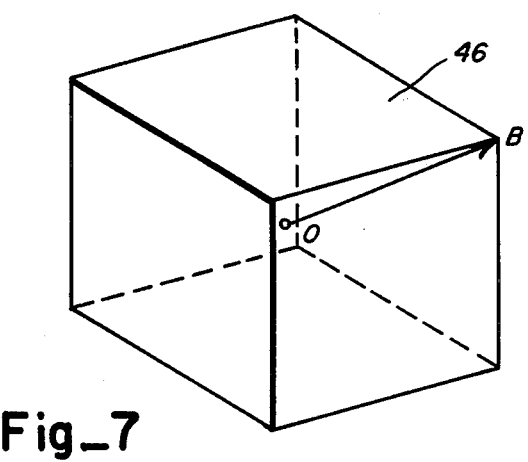
Fig_7

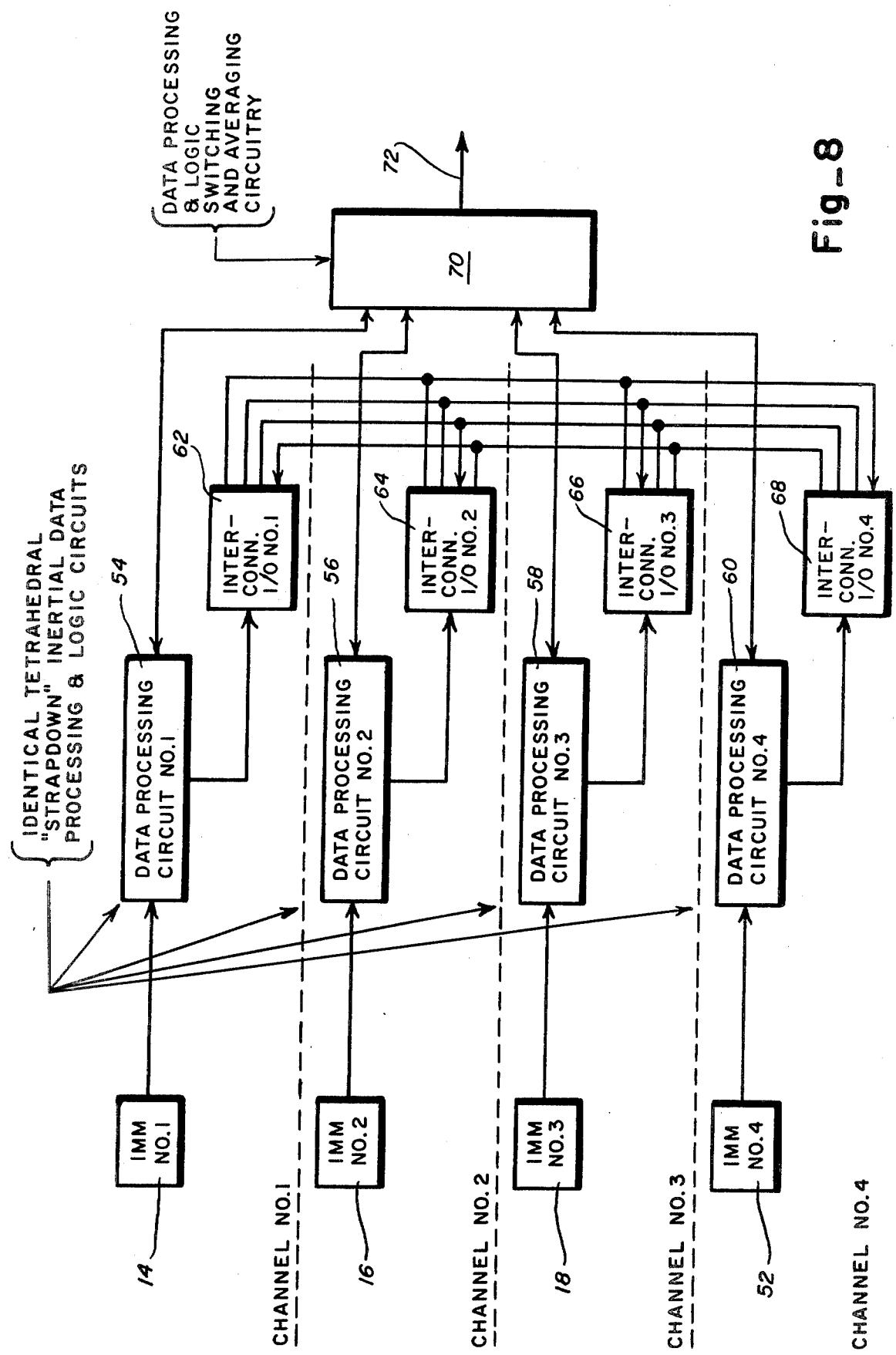

TETRAHEDRAL REDUNDANT INERTIAL REFERENCE UNIT

BACKGROUND OF THE INVENTION

This invention relates to redundant inertial reference units employing a symmetrical gyroscope configuration.

It has previously been proposed to use redundant systems of gyroscopes arranged along non-orthogonal axes in such a manner that the system could suffer a failure of any two gyroscopes and still be capable of determining the essential location of a vehicle in inertial space. In this connection, and as a general background reference, attention is directed to "A Redundant Strapdown Inertial Reference Unit (SIRU)", by Jerold P. Gilman and Richard A. McKern, Journal of Spacecraft, Vol. 9, No. 1, January 1972, pp. 39 to 47. This reference discloses a system in which six single-degree-of-freedom gyroscopes are employed in an arrangement where the spin vectors of the gyroscopes form an array of perpendiculars to the faces of a dodecahedron, a twelve sided solid figure having six pairs of opposed parallel faces. Such a symmetrical non-orthogonal arrangement of spin axes in an inertial reference unit allows up to two of any of the gyroscopes to fail and still have sufficient inputs available from the remaining gyroscopes to isolate the failures, disregard their output signals, and determine the location of the system in a coordinate system in inertial space. The symmetry of the system allows modular installation of each gyroscope and accompanying apparatus in the reference unit so that each module is interchangeable with all others and the system may function with up to two modules removed.

Another proposed arrangement using four two-degree-of-freedom gyroscopes is described in NASA report No. NASA CR-132419, "Investigation of Application of Two-Degree-of-Freedom Dry Tuned-Gimbal Gyroscopes to Strapdown Navigation System," by Teledyne Systems Company, Northridge, Calif. In this report, an arrangement is described in which four two-degree-of-freedom gyroscopes are utilized. Three of the gyroscopes are arranged with their spin axes orthogonal to each other. The fourth gyroscope's spin axis forms substantially the same angle with each of the other three axes. This configuration is also capable of supplying sufficient data to isolate and disregard erroneous output signals from any two of the gyroscopes and still have sufficient data from which to determine location in inertial space.

The principal advantage of the four two-degree-of-freedom gyroscope configuration over the above described dodecahedron arrangement is the reduced number of gyroscopes. However, the four gyroscope configuration sacrifices symmetry and thereby eliminates the possibility of the modular packaging approach of the dodecahedron configuration.

SUMMARY OF THE INVENTION

In accordance with the invention, four two-degree-of-freedom gyroscopes or inertial measurement modules (IMM), are arranged in an inertial reference unit so that the spin vectors of the four gyroscopes of IMM's form an array of perpendiculars to the respective four faces of an equilateral tetrahedron, each vector forming an angle of substantially 109.4 degrees with each of the other vectors.

This configuration results in simplification of the equations and resultant equipment necessary to isolate failed gyroscopes and convert the gyroscope output signals to a coordinate system fixed in inertial space; i.e., the commonality of angles between the vectors results in a common set of constants in the necessary equations.

Further, this symmetrical tetrahedron arrangement provides symmetry of orientation between the gyroscope units and the cube in which the equilateral tetrahedron may be inscribed, thereby facilitating uniformity in packaging the gyroscope units.

Other objects, features and advantages will become apparent from a consideration of the following detailed description and from the drawings.

BRIEF DESCRIPTION OF THE DRAWINGS

FIG. 1 is a schematic showing of the tetrahedral configuration of the gyroscopes or IMM's employed in the inertial reference unit of the present invention;

FIG. 2 shows the equilateral tetrahedron of FIG. 1 inscribed in a cube;

FIG. 3 shows the orientation of the spin axes of the four gyroscopes included in the inertial reference unit with reference to a cube oriented identical to that of FIG. 2;

FIGS. 4, 5, 6 and 7 show individual cubes with the gyroscope a spin axis pointed toward one corner of each of the cubes and which may implement the four gyroscope orientations indicated in FIG. 3; and FIG. 8 is a block circuit diagram showing a data processing circuit which may be employed in the calculation of rotation and other inertial guidance information.

DETAILED DESCRIPTION

With reference to FIG. 1, a reference equilateral tetrahedron 12 is shown. In addition three gyroscope and accelerometer units 14, 16 and 18 are shown on the three exposed equilateral faces 20, 22 and 24 of the equilateral tetrahedron. Of course a fourth gyroscope and accelerometer unit is located on the rear equilateral triangular face of the tetrahedron 12, which would be in the plane of the paper of FIG. 1 and concealed from view.

Each of the gyroscope and accelerometer assemblies or inertial measurement modules (IMM) 14, 16 and 18 is made up of a gyroscope and two associated accelerometers. These gyroscope and accelerometer arrangements may be of any known construction, and may by way of particular example be in the form shown in U.S. patent application Ser. No. 673,605, filed Apr. 5, 1976, inventor Robert J. G. Craig now U.S. Pat. No. 4,143,451 which issued Mar. 13, 1979; and the accelerometers may be of the form shown in U.S. Pat. No. 3,498,138, granted Mar. 3, 1970. The inertial measurement modules (IMM) 14, 16, 18 and 52 each contain two sensitive axes, both of which are parallel to a respective plane of an equilateral tetrahedron. Instead of a conventional two-degree-of-freedom gyroscope, the IMM may contain two one-degree-of-freedom gyroscopes. This would enable the IMM to be further subdivided into units of one gyroscope and one accelerometer for packaging.

FIG. 2 shows an equilateral tetrahedron 12 inscribed in a cube 26. It may be noted in passing that the tetrahedron extends to the four corners A, B, C, and D as shown in FIG. 2.

FIG. 3 shows the same cube 26 with the same four corners A, B, C and D and also shows the vectors OA, OB, OC and OD which are aligned with the spin axes of the four gyroscope units mounted on the four faces of the equilateral tetrahedron 12. Note for example that the vector OA is perpendicular to the tetrahedron face BCD, that the vector OB is perpendicular to the tetrahedron face ACD, and that similarly vectors OC and OD are perpendicular to the equilateral triangular faces ABD and ABC respectively, of the equilateral tetrahedron 12.

In FIGS. 4, 5, 6 and 7, IMM units are shown schematically mounted in each of the cubes shown in these individual figures. The relationships between FIGS. 4, 5, 6 and 7 will also be noted.

Starting with FIG. 4 the cube 32 which is oriented similarly to the cube 26 of FIG. 3, shows the gyroscope vector OA pointing toward the upper left corner of the cube 32. FIG. 5 shows cube 34 with gyroscope vector OC pointing to the lower front corner of the cube. Note that the vector orientation shown in FIG. 5 may be obtained from that of FIG. 4 by rotating the cube of FIG. 4 about the axis 36 in the direction indicated by the circular arrow 38. Similarly, with reference to FIG. 6, the position of the vector OD in cube 40 may be obtained by the rotation of cube 34 of FIG. 5 about the axis 42 as indicated by the circular arrow 44.

Finally, referring to FIG. 7, the vector orientation OB of cube 46 may be obtained by the rotation of the cube 40 of FIG. 6 about the axis 48 as indicated by arrow 50.

In conclusion, relative to the orientation and geometry of the present tetrahedral inertial reference unit, the four gyroscope units have their axes oriented symmetrically with respect to one another, and none is aligned with any of the other three. Incidentally, the angle between each of the vectors is approximately 109.4 degrees.

With reference to FIG. 8 the gyroscope units, 12, 16 and 18 as shown in FIG. 1 provide three of the inputs to the data processing circuit, and the fourth said gyroscope unit 52, which was not shown in FIG. 1 provides the fourth basic input. Incidentally, as noted above, the gyroscope units are also referred to as inertial measurement modules or "IMM" units, and this designation is employed in the circuit of block circuit diagram of FIG. 8. Each of the gyroscope units 12, 16, 18 and 52 are connected to one of the data processing and logic circuits 54, 56, 58 and 60, respectively. The input output (or I/O) interconnection circuits 62, 64, 66 and 68 supply information from each of the data processing and logic circuits 54, 56, 58 and 60 to all of the others.

From a theoretical standpoint each of the two-degree-of-freedom gyroscopes employed in the present system can sense angular rotations about two axes. Accordingly, with only two gyroscope units oriented at different angles, rotations about all three axes, such as any arbitrary X, Y, and Z set of axes, can be determined. In the present system with four inertial measurement module units, all oriented in different directions, the system can be fully operative and provide accurate information with two of the IMM units inactive or defective for any reason.

Accordingly, the data processing and logic circuits 54, 56, 58 and 60 compare data supplied by each of the four IMM units, identifies defective or inoperative IMM units, rejects information from defective or inoperative gyroscope units, and averages the information supplied by operative units. This is accomplished in a known manner as taught by NASA report, "Investigation of Application of Two-Degree-of-Freedom Dry Tuned-Gimbal Gyroscopes to Strapdown Navigation Systems," Final Report, NASA CR-132419, April 1974, Teledyne Systems Company, Northridge, Calif. The data processing and logic circuits then resolve the averages to correct IMM input signals into navigation information using strapdown navigation equations. An example of this resolving technique is shown in the above mentioned report.

The final navigational information obtained from circuits 54, 56, 58 and 60 is provided on four cables connecting the data processing and logic circuits 54, 56, 58 and 60 to the data processing and logic circuit 70. This circuit compares the input signals resolved in the four logic circuits 54, 56, 58 and 60, and performs a similar function to that described above for circuits 54, 56, 58 and 60 in that it detects errors in the logic circuitry and data processing of circuits 54, 56, 58 and 60, switches out any erroneous information, and averages the valid information to provide an accurate representation of rotation of the craft and other inertial navigation outputs on output cable 72 from the logic circuit 70.

In closing, other minor changes and configurations may be employed to implement the present invention. For example, logic circuitry other than that shown in FIG. 8 can be employed to accomplish the same function. In addition, any or all of the gyros employed in the present system may be oriented in either direction as they are still sensitive about two axes notwithstanding the direction of rotation. While the present system is primarily intended for strapdown applications, it is also applicable to stable platform type systems. Other comparable variations in the system are within the spirit and scope of the invention.

What is claimed is:

1. A symmetrical redundant inertial reference unit comprising:
   (a) a plurality of gyroscopes included in said reference unit, the gyroscopes of said reference unit consisting solely of four two-degree-of-freedom gyroscopes, each said gyroscope having its two sensitive axes substantially perpendicular to each other;
   (b) means associated with each gyroscope for generating two output signals from each said gyroscope, one output signal being generated for each of said two sensitive axes, each signal representing rate of angular motion about one sensitive axes; and
   (c) means for fixedly positioning each said gyroscope with respect to each other in a primary coordinate system with the two sensitive axes of each of said four gyroscopes defining a plane which intersects the planes defined by the two sensitive axes of each of the other three gyroscopes at substantially the same angle, whereby said unit is capable of providing correct coordinate information about three mutually orthogonal axes despite failure of up to two of said four gyroscopes.

2. An inertial reference unit as defined in claim 1 further comprising means for resolving said gyroscope output signals into corresponding information relative to a second coordinate system.

3. The inertial reference unit described in claim 2 further comprising:
   (a) means for measuring linear motion along one or more primary coordinate system directions and for generating output signals representative of the magnitude of said motion; and (b) wherein said resolving means also includes means for resolving output signals from said measuring means into information relative to said second coordinate system.

4. The inertial reference unit described in claim 2 further comprising means for analyzing said gyroscope output signals to identify at least one of said gyroscopes giving erroneous output signals.

5. The inertial reference unit described in claim 4 further comprising means for blocking erroneous data from at least one gyroscope, whereby said unit remains capable of determining correct coordinate location in said second coordinate system during periods when up to two of said gyroscopes are giving erroneous output signals.

6. The inertial reference unit described in claim 2 further comprising:
(a) means for measuring linear motion along one or more primary coordinate system directions and for generating output signals repesentative of the magnitude of said linear motions; and
(b) means for resolving said output signals from said measuring means into corresponding information relative to a second coordinate system.

7. A reference unit as defined in claim 1 further comprising symmetrical data processing means for detecting invalid initial signals from said gyroscopes and for averaging valid inertial signals.

8. A symmetrical redundant inertial reference unit comprising:
(a) a plurality of gyroscopes included in said reference unit, the gyroscope of said reference unit consisting solely of four two-degree-of-freedom gyroscopes, each said gyroscope having its two sensitive axes substantially perpendicular to each other;
(b) means associated with each said gyroscope for generating two output signals, each output signal generated representing the rate of angular motion about one of said sensitive axes;
(c) means for fixedly positioning said gyroscopes in a primary coordinate system with said sensitive axes of each of said four gyroscopes defining a plane parallel to the respective faces an equilateral tetrahedron, whereby said unit is capable of providing correct coordinate information about three mutually orthogonal axes of a second coordinate system despite failure of up to two of said four gyroscopes; and
(d) means for resolving said output signals into corresponding information referenced to said second coordinate system to determine angular position in said second coordinate system.

9. The inertial reference unit described in claim 8 further comprising:
(a) means for analyzing output signals from said gyroscopes to identify at least one of said gyroscopes giving erroneous outputs; and
(b) means for blocking said erroneous output signals in said resolving means whereby said inertial reference unit is capable of resolving correct coordinate location with up to two of said gyroscopes rendering erroneous signals.

10. A symmetrical redundant strapdown inertial reference unit for a vehicle comprising:
(a) a plurality of gyroscopes included in said reference unit, the gyroscopes of said reference unit consisting solely of four two-degree-of-freedom gyroscopes, each gyroscope having two sensitive axes substantially orthogonal to each other and to the spin vector along the spin axis;
(b) means associated with each said gyroscope for generating two output signals from each said gyroscope, each signal being respresentative of the rate of angular motion about one of said sensitive axes;
(c) means for fixedly positioning said gyroscope in a primary coordinate system with said sensitive axes of each of said four gyroscopes defining a plate parallel to the respective faces of an equilateral tetrahedron, and with said spin vectors pointing away from said tetrahedron;
(d) means for measuring linear motion along one or more primary coordinate directions, said measuring means generating output signals representative of the magnitude of motion in said directions;
(e) means for resolving said gyroscope outputs in said motion-measuring-means outputs into corresponding information referenced to a second coordinate system having three mutually orthogonal axes; and
(f) means for isolating erroneous output signals from at least one of said gyroscopes and blocking said erroneous signals in resolving said output signals into said second coordinate system whereby said inertial reference unit is capable of resolving substantially correct three dimensional coordinate information in said second coordinate system with up to two of said gyroscopes said gyroscopes rendering erroneous output signals.

* * * * *